C. E. BLECHSCHMIDT.
WHEEL TIRE.
APPLICATION FILED SEPT. 4, 1909.
963,271.
Patented July 5, 1910.
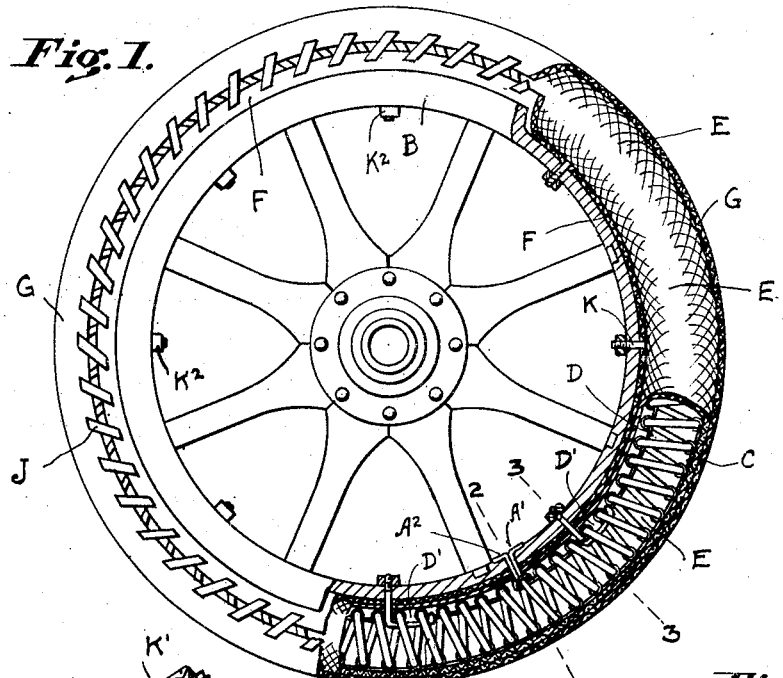
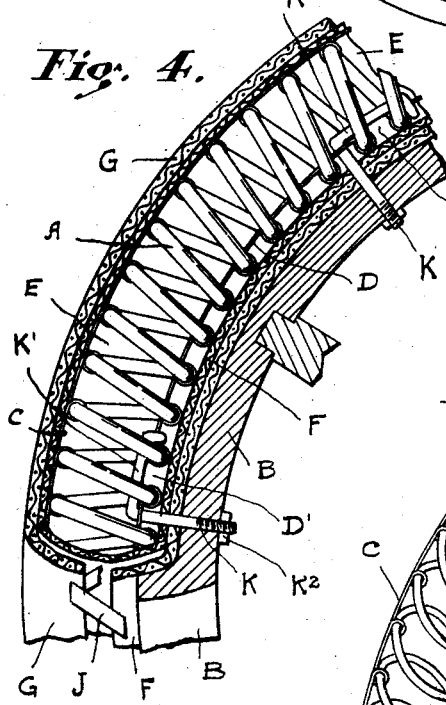
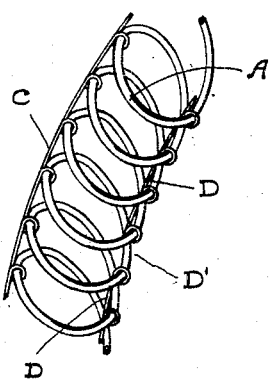
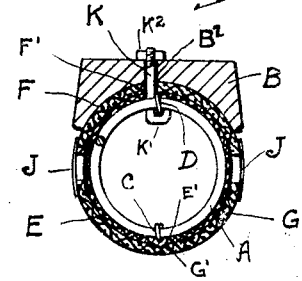
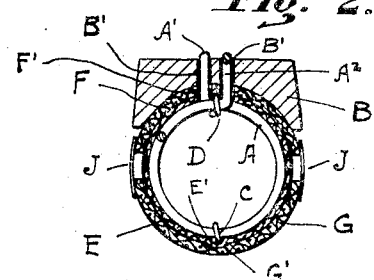
WITNESSES:
George N. Higman
Ethel L. Lister
INVENTOR
CHARLES E. BLECHSCHMIDT
BY
Thomas L. Ryan
ATTORNEY

UNITED STATES PATENT OFFICE.

CHARLES E. BLECHSCHMIDT, OF CONNERSVILLE, INDIANA.

WHEEL-TIRE.

963,271. Specification of Letters Patent. Patented July 5, 1910.

Application filed September 4, 1909. Serial No. 516,265.

*To all whom it may concern:*

Be it known that I, CHARLES E. BLECHSCHMIDT, a citizen of the United States, and a resident of the city of Connersville, in the county of Fayette and State of Indiana, have invented a new and useful Wheel-Tire, of which the following is a specification.

This invention relates to wheel tires having the quality of resiliency. It is well known that in resilient tires as same are now constructed and wherein an air tight tube capable of retaining highly compressed air is the means for affording the desired resiliency, more or less trouble and expense is necessary in order to keep the tire properly inflated. Moreover, tires so constructed are at all times liable to become punctured, in which event the resiliency of the tire is at once lost and the tire rendered unfit for use.

The objects of my invention are to overcome the foregoing faults and to provide a tire which will be resilient and whose resiliency will not be affected by the usage and wear inflicted upon same.

Further objects of my invention are to provide a tire of the character described, which will be light in weight, economical of construction, durable, and not liable to get out of order or repair and which will be capable of retaining a tenacious engagement with the rim of the wheel.

These and other objects which will appear as the nature of my invention is more fully understood, are accomplished by the new combination, construction and arrangement of parts described in this specification, defined in the appended claims and illustrated in the accompanying drawings, in which corresponding parts are represented by similar characters of reference throughout the several views.

Figure 1 is a side view of an ordinary wheel equipped with my invention, a portion thereof being broken away. Fig. 2 is a transverse sectional view on the line 2—2 Fig. 1. Fig. 3 is a transverse sectional view on the line 3—3 Fig. 1. Fig. 4 is an enlarged side view, a portion of the casing being shown in central longitudinal cross section. Fig. 5 is a detached perspective view of the skeleton portion of my improved tire. Fig. 6 is an enlarged sectional view of a portion of my improved tire as shown in Fig. 3.

My improved tire consists of a resilient skeleton having a wrapping of pliable fabric such as duck or canvas and about which wrapping is arranged a continuous outer covering of flexible material, preferably of leather, and which outer covering is divided into upper and lower half sections. These sections I will designate as the shoe and the tread. The ends $A^1$ and $A^2$ of the continuous steel spring wire spiral A are brought together as shown in Fig. 2, and are capable of being inserted through holes $B^1$ provided therefor in the wheel rim B. When the tire is in place on the wheel, these ends are secured and occupy the position as shown in Fig. 2. The length of this steel spring wire is such that when its ends are brought together as just described, the internal circumference of the skeleton so formed is of a proper dimension to fit the wheel rim having a given diameter, the said shoe being interposed, as will be hereinafter referred to. In order to retain a uniform distance between the coils of, and to impart the desired peripheral stability to the skeleton, I provide a centrally disposed circumferential bonding wire C which at regular intervals is securely looped around the successive coils of the said skeleton, as plainly shown in Fig. 5. This external bonding wire or member performs another function which will presently be made clear. The internal central portions of the said coils are also maintained at regular and proper distances apart. To accomplish this purpose, and also to afford the necessary flexibility longitudinally of the skeleton so that it may be capable of being easily placed in position on the rim, I have arranged the internal bonding wires D which will bind at proper distance apart a given number of the coils of the skeleton. The spaces $D^1$ between these groups of coils so bound by the internal wires D will permit of the end coils of the several groups being sprung together. By this arrangement the internal portion of the skeleton will be capable of manipulation sufficiently that the spiral may be easily passed over the side of the grooved rim B into position. The skeleton so formed is provided with a covering E which may be made of any suitable flexible material, preferably of ducking or canvas. The purpose of this covering is to afford protection for the skeleton from dirt and moisture, and also to provide a suitable wearing surface for the shoe F and the tread G. These upper and lower half sections, termed the shoe F and tread G respectively, are made of flexible material, preferably of leather. Each is semicircular in cross section, as shown in Figs. 2 and 3, and when placed in position will substantially surround the covered skeleton. The facing edges of the shoe and tread are provided with a succession of perforations H, and when placed in position as shown in the drawings they are bound together on each side by the lacings J and brought down into snug engagement with the covering E.

To secure this tire to the wheel rim so as to retain it tenaciously in proper position, and to hold in proper position the free internal portions of the end coils of the several groups of the coils of the skeleton, I provide the hook bolts K. These hook bolts will be retained loosely in the holes $F^1$ through the shoe F and covering E, and the hook portions $K^1$ are of such dimension and form as to engage the two coils that form the ends of the aforesaid groups.

To place the tire in position on the wheel the internal surface is stretched or expanded sufficiently to permit the tire to take its place in the grooved rim. The hook bolts will be in registration with the holes $B^2$ in the rim and will pass down through the said holes. The nuts $K^2$ are then tightened and with the drawing down of the hook portions $K^1$ the tire will be secured immovably in position. The groove $G^1$ formed on the interior surface of the tread G will be filled by the ridge $E^1$ in the covering E. By arranging the external bonding wire C as shown in Fig. 4 and Fig. 5, the ridge $E^1$ is formed when the covering E is wrapped tightly about the skeleton as hereinbefore referred to. When the tread and shoe are brought snugly into embracement of the said covering, the continuous ridge $E^1$ will fit in the groove $G^1$ the result being that the tread will be maintained in correct alinement and there will be no wearing contact of the bonding wire against the tread.

My improved tire will have many advantages over resilient tires heretofore devised, besides having the quality of resiliency and being capable of easy placement on the wheel it will be practically indestructible, and it will hold tenaciously in position on the wheel rim. By virtue of the external bonding wire C the external portions of the coils of the spiral skeleton are maintained in correct relative position and bending thereof is prevented. Strains imposed upon the tire will be carried by the entire tire, rather than by a small area at or near the line of tread. The coils will be free to elongate transversely and by being at all times held in correct position as shown will withstand effectually the heaviest strains, and will not be warped, twisted or wrenched out of alinement. By providing the internal peripheral channel or groove $G^1$ in the tread so that continuously extending ridge formed by the bonding wire C, is engaged, all possible tendency of the bonding member C, or the loops thereof at the coils, to cut or wear, is overcome and the tread, when same is laced into connection with the shoe, as hereinbefore described, will be held in true alinement.

What I claim as my invention and desire to secure by Letters Patent of the United States, is—

1. In a wheel, the combination of a grooved rim, spaced holes therein, a resilient skeleton consisting of an endless spring wire spiral adapted to rest in the groove of said rim, a continuous external peripheral bonding member having connections with each coil of said spiral, a noncontinuous bonding member engaging the inner side of the said spiral the several portions of same having connections with successive series or groups of the coils of said spiral, a flexible casement for said resilient spiral, a flexible continuous annular outer covering that is divided longitudinally, connections between the two sections thereof, means to engage and to hold the meeting end coils of the said groups to the said rim comprising hook bolts having their ends disposed within the spiral and connecting adjacent groups thereof, and having their shanks to pass through apertures in the coverings of said spiral and through the holes in the said rim, and being provided with means to secure them in position substantially as described.

2. In a wheel the combination of a grooved rim, a resilient skeleton consisting of an endless spring wire spiral a flexible casement to form a covering for same, a continuous external peripheral bonding member having connections with each coil of said spiral, a non-continuous bonding member engaging the inner side of the spiral, the several portions of same having connections with successive series or groups of the coils of said spiral, a flexible shoe adapted to fit the said wheel rim and in which the said covered skeleton will rest, a flexible peripheral tread for the said covered skeleton, flexible connections between the shoe and the tread arranged on each side of the said covered skeleton, hook bolts to connect adjacent groups of the coils of said spiral and to secure them in position on the wheel rim.

In testimony whereof I have hereunto signed my name to this specification in the presence of two subscribing witnesses.

CHARLES E. BLECHSCHMIDT.

Witnesses:
EDWARD TIERNEY,
HERBERT JASPERS.